(12) United States Patent
Muramatsu

(10) Patent No.: US 7,703,743 B2
(45) Date of Patent: Apr. 27, 2010

(54) VALVE DRIVE DEVICE, ITS CONTROL METHOD AND PUMP

(75) Inventor: Kenji Muramatsu, Nagano (JP)

(73) Assignee: Nidec Sankyo Corporation (JP)

( * ) Notice: Subject to any disclaimer, the term of this patent is extended or adjusted under 35 U.S.C. 154(b) by 464 days.

(21) Appl. No.: 11/635,963

(22) Filed: Dec. 8, 2006

(65) Prior Publication Data
US 2007/0181838 A1    Aug. 9, 2007

(30) Foreign Application Priority Data
Dec. 9, 2005   (JP)   ............................. 2005-356787

(51) Int. Cl.
*F16K 31/02*   (2006.01)
(52) U.S. Cl. .................. 251/129.11; 251/331
(58) Field of Classification Search ............ 251/129.11, 251/129.12, 129.13, 331
See application file for complete search history.

(56) References Cited

U.S. PATENT DOCUMENTS

| | | | | |
|---|---|---|---|---|
| 4,593,881 A | * | 6/1986 | Yoshino | ................. 251/124 |
| 4,729,544 A | * | 3/1988 | Baumann | ............... 251/129.05 |
| 6,492,751 B1 | * | 12/2002 | Ineson et al. | .................. 310/71 |
| 6,764,060 B2 | * | 7/2004 | Fukano et al. | ......... 251/129.12 |
| 7,264,223 B2 | * | 9/2007 | Fukano et al. | ......... 251/129.07 |

FOREIGN PATENT DOCUMENTS

| | | |
|---|---|---|
| JP | 2004-327775 | 11/2004 |
| JP | 2005-54954 | 3/2005 |

\* cited by examiner

*Primary Examiner*—John K Fristoe, Jr.
(74) *Attorney, Agent, or Firm*—Cantor Colburn LLP

(57) ABSTRACT

A valve drive device may include a motor, a rotational member rotated by the motor, a linearly moving member engaged with the rotary member, a converting mechanism for converting rotation of the rotational member into linear movement of the linearly moving member, a diaphragm valve for opening or closing an opening part by linearly moving member, and an urging member for closing the opening part through the diaphragm valve. The linearly moving member is linearly moved by the rotational member and the opening part is closed by the diaphragm valve in a state that the rotational member and the linearly moving member are in a non-engagement state. The valve drive device may be mounted on a pump having an inflow path and a plurality of outflow paths.

13 Claims, 6 Drawing Sheets

[Fig. 1]
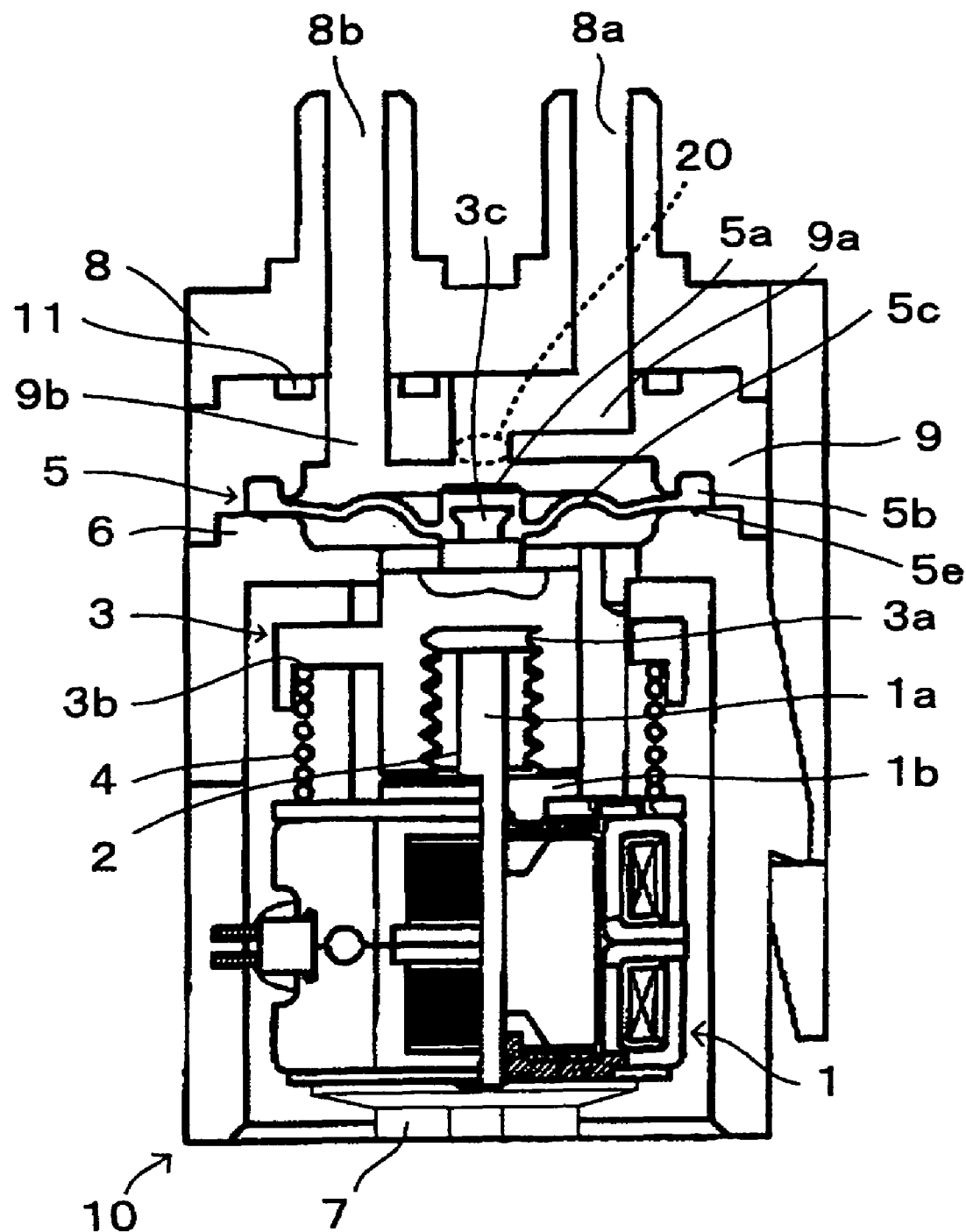

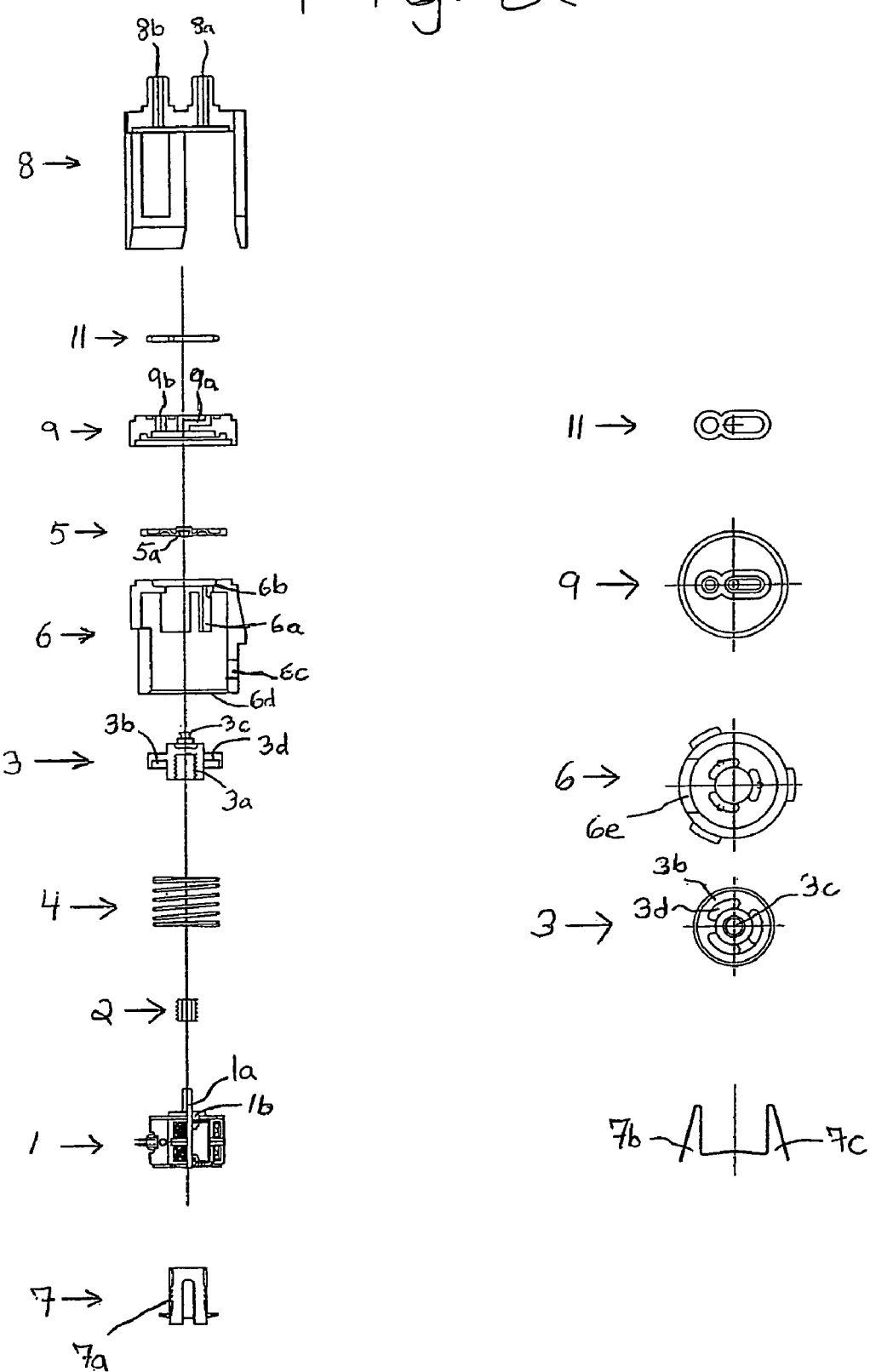

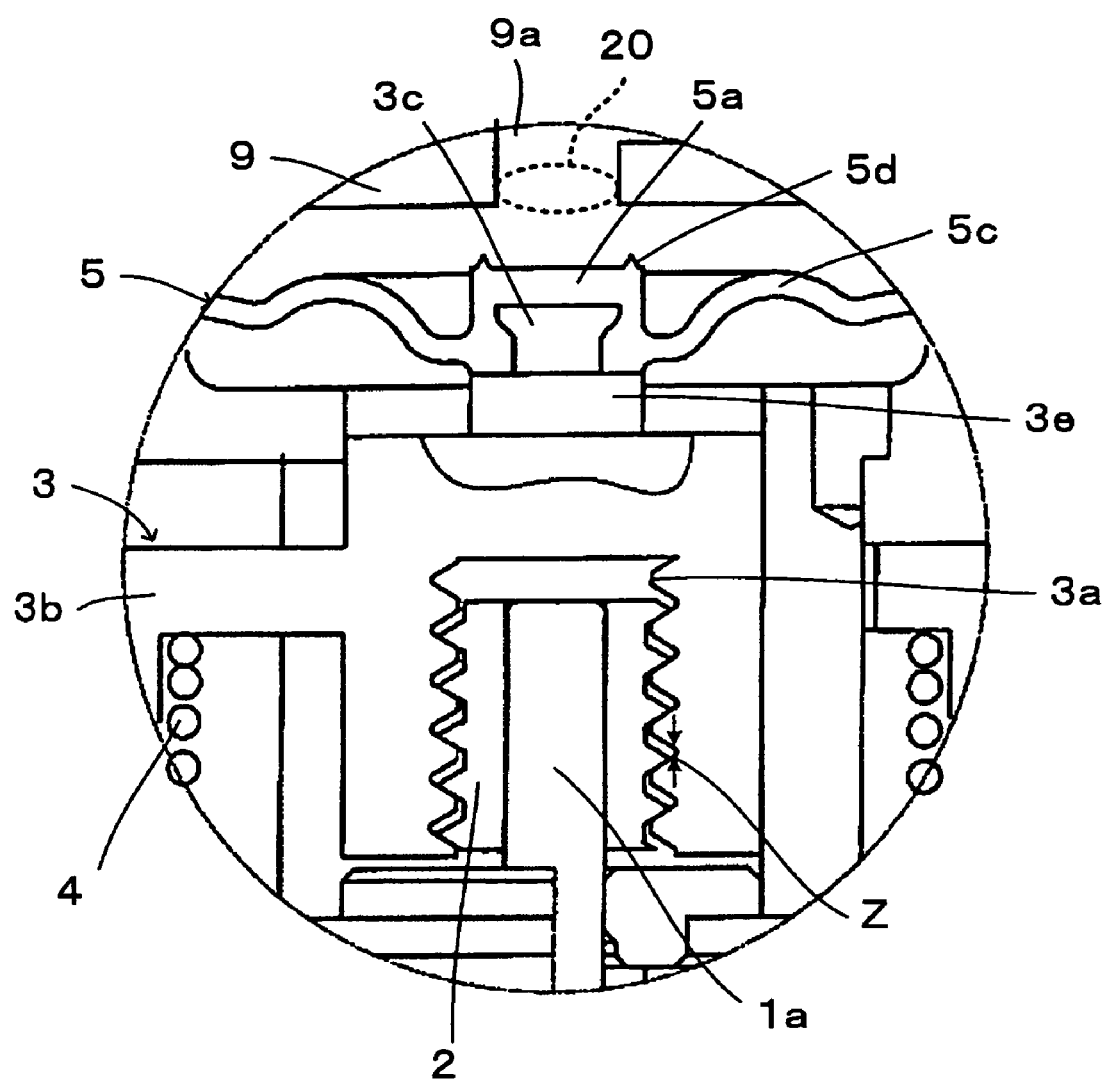
[Fig. 3]

(a)

(b)

(a)

(b)

Fig. 6a 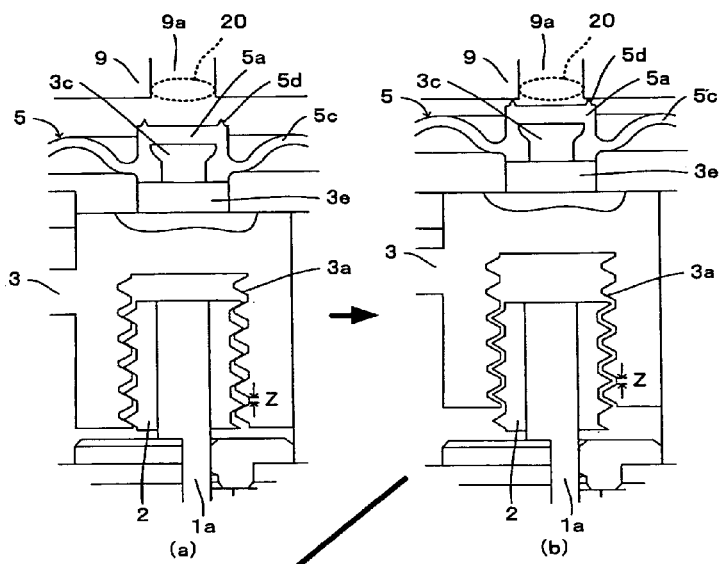 Fig. 6b
Fig. 6c 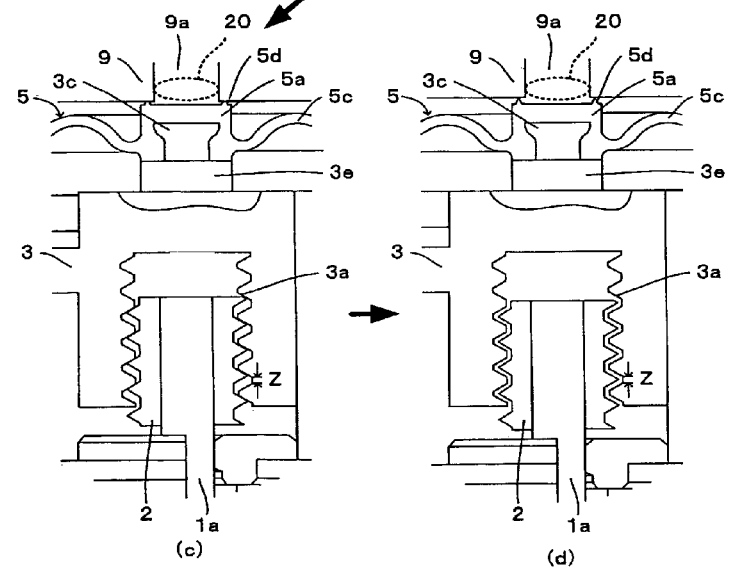 Fig. 6d

VALVE DRIVE DEVICE, ITS CONTROL METHOD AND PUMP

CROSS REFERENCE

The present invention claims priority under 35 U.S.C. §119 to Japanese Application No. 2005-356787 filed Dec. 9, 2005, which is incorporated herein by reference.

FIELD OF THE INVENTION

An embodiment of the present invention may relate to a valve drive device in which a valve hold member is moved to open or close a flow path by a motor, a control method for the valve drive device, and a pump utilizing the valve drive device.

BACKGROUND OF THE INVENTION

A refrigerator or an air conditioner is installed with a valve drive device in which a valve element is moved by a drive source such as a stepping motor to open and close a flow path for refrigerant to control temperature in a chamber which is in communication with the flow path. Further, a methanol type of fuel cell has been recently developed as a power supply for a mobile apparatus such as a notebook type of personal computer. A valve drive device is also utilized to adjust a flow rate of fuel when the fuel (methanol and water) as a reducing agent is supplied to a fuel electrode layer (cell) in the methanol type of fuel cell.

As described above, a valve drive device is utilized in various fields. In this case, as an apparatus on which the valve drive device is mounted is downsized, it becomes more and more important to accurately control the flow rate of fluid such as refrigerant or fuel. One of measures for accurately controlling the flow rate of fluid is to improve the closing performance (sealing property) of a valve element (see, for example, Japanese Patent Laid-Open No. 2005-54954 and Japanese Patent Laid-Open No. 2004-327775).

In the above-mentioned former patent reference, a control valve is disclosed in which a sealing property in a closing state of a valve element is improved. Specifically, in the former reference, a valve drive device is disclosed in which a drive shaft of a stepping motor is reversibly rotated to linearly move an elevating body up and down and the step-out of the motor is detected with an encoder to control an opening degree of a diaphragm (control valve). In the valve drive device, a projection is formed at a periphery of an inflow opening of fluid and the projection is abutted with a control valve. Therefore, the sealing property in the closing state of the valve element is improved.

Further, a substrate processing apparatus and a discharge control method in which discharging accuracy from a nozzle for drug solution is improved is disclosed in the above-mentioned latter patent reference. Specifically, in the latter reference, a substrate processing apparatus is disclosed which includes a flow control valve for opening or closing a pipe through which drug solution is circulated and an encoder. In the substrate processing apparatus, the step-out of a motor is detected with the encoder to cause the flow control valve to be in a closing state or to cause a moving quantity (stroke) of the flow control valve to be adjusted according to property of the drug solution and thus discharging accuracy from a nozzle for drug solution is improved.

As described above, in the above-mentioned patent references, the step-out of a motor is detected with an encoder to close a flow path with a control valve, and the control valve is abutted with a projection or the stroke of the control valve is adjusted to improve the sealing property with the valve element.

However, in the above-mentioned patent references, as described above, the step-out of a motor is detected with an encoder and the closing state of a valve is maintained by using a detent torque of the motor. Therefore, since error of the motor and errors of respective members from a rotor to a valve element are accumulated or piled up, a stable sealing property in the closing state of the valve element is not obtained.

For example, in a state that a valve element of a control valve or the like abuts with an inflow opening (or outflow opening) for fluid to close a flow path, since the motor is stepped out, a closing force for closing the inflow opening (or outflow opening) varies in a range of a stroke length of elastic deformation of the valve element and in a range of the number of detent poles of the motor to cause the closing force to vary whenever the flow path is closed. As a result, since closing performance of the valve element is varied, the sealing property in the closing state of the valve element is not stable.

Further, when the valve element is pressed with too strong force at the time when the flow path is closed, an elastic force of the valve element is varied due to hysteresis or the abutting part is worn. As a result, the closing performance of the valve element is further varied and the sealing property in the closing state of the valve element becomes further more unstable.

As described above, in the conventional valve drive device, since the sealing property in the closing state of the valve element is hard to stabilize, reliability for closing performance of the valve element is not satisfactory.

SUMMARY OF THE INVENTION

In view of the problems described above, an embodiment of the present invention may advantageously provide a valve drive device in which its sealing property in a closing state of a valve element is stabilized and reliability regarding closing performance of the valve element can be improved, and provide a control method for the valve drive device and a pump utilizing the valve drive device.

Thus, according to embodiments of the present invention, there may be provided the following valve drive devices, control methods for the valve drive device and the pump utilizing the valve drive device.

In accordance with an embodiment, there is provided a valve drive device including a motor, a rotational member which is rotated by the motor, a linearly moving member which is engaged with the rotational member, a converting mechanism for converting rotation of the rotational member into linear movement to linearly move the linearly moving member, a diaphragm valve which is formed of an elastic body for opening or closing an opening part based on the linear movement of the linearly moving member, and an urging member for closing the opening part through the diaphragm valve which is abutting with the opening part in an urging state. The converting mechanism converts rotation of the rotational member into linear movement of the linearly moving member by engaging the rotational member and the linearly moving member with each other and closing the opening part with the diaphragm valve in a state that the rotational member and the linearly moving member are in a non-engagement state.

According to this embodiment, the valve drive device is provided with the converting mechanism for converting rotation of the rotational member into linear movement to linearly move the linearly moving member, the diaphragm valve having elasticity for opening or closing the opening part based on the linear movement of the linearly moving member, and the urging member for closing the opening part through the diaphragm valve which is abutting with the opening part in an urging state. Therefore, the opening part is closed with the diaphragm valve which is urged by the urging member in the state that the rotational member and the linearly moving member are not engaged with each other and thus its sealing property in the closing state of the diaphragm valve is stabilized.

In other words, the valve drive device in accordance with the embodiment of the present invention is provided with the urging member by which the diaphragm valve is abutted with the periphery of the opening part (for example, the inflow opening or the outflow opening for fluid) in an urged state to close the opening part. Therefore, even when the rotational member and the linearly moving member are not engaged with each other in the closing state of the diaphragm valve, a closing force which closes the opening part is stably obtained by the urging member. As a result, the sealing property in the closing state with the diaphragm valve is stabilized and thus reliability regarding closing performance of the diaphragm valve can be improved.

Further, as described above, the rotational member and the linearly moving member are in a non-engagement state in the closing state of the diaphragm valve. Therefore, an elastic force of the diaphragm valve is prevented from being varied based on the hysteresis due to an excessive force applied to the diaphragm valve and its abutting part is prevented from increasing wear. Therefore, closing performance of the diaphragm valve can be prevented from varying due to these causes and thus reliability regarding closing performance of the diaphragm valve can be improved. Further, since the abutting part is prevented from increasing wear, durability can be improved.

In addition, in a conventional valve drive device, a closing force for closing the opening part varies within a stroke length of elastic deformation of a valve element and in a range of detent pole number of the motor and thus accurate prediction for the closing force is difficult. However, according to the embodiment of the present invention, since the closing force is obtained from the urging member, the closing force can be set accurately. Further, in the conventional valve drive device, since error of the motor and errors of respective members from the rotor to the valve element are accumulated or piled up, a stable sealing property in the closing state of the valve element is not obtained. However, according to the embodiment of the present invention, the opening part is closed by the urging force of the urging member and thus the above-mentioned accumulated errors can be reduced, that is, the number of components for closing can be reduced and, as a result, sealing property can be stabilized.

In accordance with an embodiment, the urging member may utilize any member which is capable of causing the diaphragm valve to abut with the periphery of the opening part in an urging state. For example, a member such as a coil spring, a flat spring, a magnetic spring and rubber may be used as the urging member. Its size, shape and cross sectional area are not limited in any type of the urging member.

In accordance with an embodiment, the rotational member and the linearly moving member are in a non-engagement state in the closing state of the diaphragm valve. In this specification, the non-engagement state includes not only a state where the rotational member and the linearly moving member do not contact with each other completely but also a state where the rotational member and the linearly moving member partly contact with each other. Even when the rotational member and the linearly moving member contact with each other, in the case that the contacting portion is a portion where the closing force for closing the opening part by the urging member is not affected, this state corresponds to the non-engagement state in this specification. In addition, the non-engagement state also includes a state where a load is not applied even when the rotational member and the linearly moving member contact with each other.

In accordance with an embodiment, there is provided the valve drive device which is described in the above-mentioned paragraph and in which the linearly moving member includes a pressed part which is engaged with and is pressed by the rotational member and the linearly moving member is linearly moved with the pressed part which is pressed by the rotary member.

According to this embodiment, the linearly moving member includes a pressed part which is engaged with and is pressed by the rotational member and the linearly moving member is linearly moved with the pressed part which is pressed by the rotary member. Therefore, the pressed part is pressed by the rotational member to linearly move the linearly moving member until the diaphragm valve becomes to a closing state and, when the diaphragm valve has been in the closing state, the rotational member and the pressed part are set to be in a non-engagement state. Further, in this case, a force for closing the opening part can be obtained stably by the urging member and thus reliability regarding closing performance of the diaphragm valve can be improved.

In accordance with an embodiment, the pressed part may be any part which is engaged with and pressed by the rotational member. For example, when the rotational member is a male screw, the pressed part may be a slant face of a female screw engaging with the male screw and, when the rotational member is provided with a flange, the pressed part may be a part (member) which is pressed by the flange.

In accordance with an embodiment, there is provided the valve drive device which is described in the above-mentioned paragraph and in which the rotational member and the pressed part of the linearly moving member are engaged with each other through screw engagement or cam engagement.

According to this embodiment, the rotational member and the pressed part of the linearly moving member are engaged with each other through screw engagement (male screw and female screw or rack and pinion) or cam engagement Therefore, for example, a pressed part of a female screw (slant face for engaging with a male screw) is pressed by a rotational member comprised of a male screw to linearly move the linearly moving member until the diaphragm valve becomes to a closing state and, when the diaphragm valve has been in the closing state, the rotational member comprised of the male screw and the pressed part of the female screw become to a non-engagement state. In this case, a force for closing the opening part can be obtained stably by the urging member and thus reliability regarding closing performance of the diaphragm valve can be improved.

In accordance with an embodiment, there is provided the valve drive device which is described in the above-mentioned paragraph and in which a gap space, with which the rotational member and the linearly moving member are in the non-engagement state when the opening part is closed by the diaphragm valve, is formed between the rotational member and the pressed part of the linearly moving member.

According to this embodiment, a gap space with which the rotational member and the linearly moving member are in the non-engagement state when the opening part is closed by the diaphragm valve, is formed between the rotational member and the pressed part of the linearly moving member. Therefore, for example, the non-engagement state between the rotational member and the pressed part of the linearly moving member can be easily formed by means of that the linearly moving member having the pressed part is moved in a reverse direction to the pressed direction of the pressed part As a result, similarly to the above-mentioned embodiment, a force for closing the opening part can be obtained stably by the urging member and thus reliability regarding closing performance of the diaphragm valve can be improved.

In a valve drive device in accordance with an embodiment, the motor is a stepping motor, the rotational member is a lead screw which is fixed to a rotor shaft of the motor, and the linearly moving member is engaged with the lead screw through screw engagement having a play in an axial direction and is prevented from rotating through the converting mechanism. In this case, it is preferable that the linearly moving member is a valve holding member which is provided with the diaphragm valve, and the valve holding member is formed so as to be concentric with the lead screw and is provided with a screw part which is formed in an inside of the valve holding member so as to be engaged with the lead screw and is provided with a spring receiving part which is formed in an outer peripheral portion of the valve holding member so as to receive the urging member. According to the structure as described above, the valve drive device in accordance with this embodiment can be structured in a small size. In accordance with an embodiment of the present invention, the valve drive device is structured such that, when the opening part is closed by the diaphragm valve, a screw of the screw part of the valve holding member is set to be an intermediate position where its screw is not engaged with a screw of the lead screw through the play in the axial direction, and the opening part is closed with the diaphragm valve only by the urging force of the urging member. In this case, the opening part can be surely closed with the diaphragm valve only by the urging force of the urging member.

In accordance with an embodiment, there is provided a control method for the valve drive device which is described in the above-mentioned paragraph, which includes driving the motor to move the linearly moving member to a position where the diaphragm valve is abutted with and closes the opening part by the urging member, and stopping the motor at a position where the rotational member and the linearly moving member are in a non-engagement state.

According to this control method in accordance with an embodiment, the linearly moving member is moved until the diaphragm valve is abutted with and closes the opening part by the urging member and then stopped at a position where the rotational member and the linearly moving member are in a non-engagement state. Therefore, in the closing state of the diaphragm valve, a force for closing the opening part can be obtained stably by the urging member and thus reliability regarding closing performance of the diaphragm valve can be improved.

In accordance with an embodiment, there is provided a control method which is described in the above-mentioned paragraph, the motor is driven to move the linearly moving member to a position where the diaphragm valve is abutted with and closes the opening part by the urging member, and then rotation of the rotational member is reversed and the motor is stopped at a position where the rotary member and the linearly moving member are in a non-engagement state.

According to this embodiment, the motor is driven to move the linearly moving member to a position where the diaphragm valve is abutted with and closes the opening part by the urging member, and then rotation of the rotational member is reversed and the motor is stopped at a position where the rotary member and the linearly moving member are in a non-engagement state. Therefore, a non-engagement state of the rotational member with the linearly moving member can be easily obtained only by controlling rotational direction of the motor. In this non-engagement state, a force for closing the opening part can be obtained stably by the urging member.

Specifically, it may be structured that the motor is a stepping motor, the rotational member is a lead screw which is fixed to a rotor shaft of the motor, and the linearly moving member is a valve holding member which is engaged with the lead screw through screw engagement having a play in an axial direction and is prevented from rotating and is provided with the diaphragm valve. Further, the control method may include rotating the lead screw by rotating the motor, linearly moving the valve holding member which is engaged with the lead screw to cause the diaphragm valve to abut with the opening part, after that, reversing the motor to stop at a position where the lead screw is not engaged with the valve holding member through the play in the axial direction and, as a result, the opening part is closed with the diaphragm valve only by the urging force of the urging member.

In accordance with an embodiment, there is provided a control method which is described in the above-mentioned paragraph and in which the motor is driven to move the linearly moving member to the position where the diaphragm valve is abutted with and closes the opening part by the urging member, and then rotation of the rotational member is stopped at a position where the rotary member and the linearly moving member are in a non-engagement state before the rotary member presses the linearly moving member.

According to this embodiment, the motor is driven to move the linearly moving member to the position where the diaphragm valve is abutted with and closes the opening part by the urging member, and then rotation of the rotational member is stopped at a position where the rotary member and the linearly moving member are in a non-engagement state before the rotary member presses the linearly moving member. Therefore, a non-engagement state of the rotational member with the linearly moving member can be easily obtained. Especially, different from the control method described above, since the rotating direction of the motor is not required to change, a force for closing the opening part can be stably obtained while the control program for controlling the motor is simplified.

Specifically, it may be structured that the motor is a stepping motor, the rotational member is a lead screw which is fixed to a rotor shaft of the motor, and the linearly moving member is a valve holding member which is engaged with the lead screw through screw engagement having a play in an axial direction and is prevented from rotating and is provided with the diaphragm valve. Further, the control method may include rotating the lead screw by rotating the motor, linearly moving the valve holding member which is engaged with the lead screw to cause the diaphragm valve to abut with the opening part and, after that, stopping rotation of the lead screw at a position where the lead screw and the valve holding member are in a non-engagement state through the play in the axial direction before the lead screw presses the valve holding member and, as a result, the opening part is closed with the diaphragm valve only by the urging force of the urging member.

In accordance with an embodiment, there is provided a pump including an inflow path in communication with an inflow opening, a valve drive device which is disposed on an inflow side in the inflow path and is structured as described in the above-mentioned paragraph, a pump chamber which is connected with the inflow path, a pump mechanism which is arranged in the pump chamber, a plurality of outflow paths which are extended from the pump chamber and are respectively in communication with a plurality of outflow openings, and a plurality of valve drive devices, each of which is disposed on an outflow side in each of a plurality of the outflow paths and is structured as described in the above-mentioned paragraph.

According to this embodiment, a pump is provided with an inflow path and a plurality of outflow path, a valve drive device disposed on an inflow side in the inflow path, a pump chamber which is connected with the inflow path, a pump mechanism which is arranged in the pump chamber, and a plurality of valve drive devices, each of which is disposed on an outflow side in each of a plurality of the outflow paths. Therefore, a pump can be provided in which reliability regarding closing performance of the diaphragm valve is improved.

As described above, according to the valve drive device, the control method for the valve drive device and the pump utilizing the valve drive device in accordance with the present invention, the closing force for closing the opening part is stably obtained by the urging member which is provided in the valve drive device without utilizing the detent torque of the motor. Therefore, the sealing property in the closing state by the diaphragm valve is stabilized and, as a result, reliability regarding closing performance of the diaphragm valve can be improved. In addition, closing performance of the diaphragm valve can be prevented from varying due to the hysteresis or abrasion of the diaphragm valve. In addition, the closing force with the diaphragm valve can be set accurately.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a longitudinal sectional view showing a valve drive device in accordance with an embodiment of the present invention.

FIG. 2 is an exploded view showing a valve drive device in accordance with an embodiment of the present invention.

FIG. 3 is an enlarged view showing a center portion of the valve drive device shown in FIG. 1.

FIGS. 6(a), 6(b), 6(c) and 6(d) are explanatory views for describing a control method for a valve drive device in accordance with an embodiment of the present invention.

DETAILED DESCRIPTION OF THE PREFERRED EMBODIMENTS

Figure 4A:
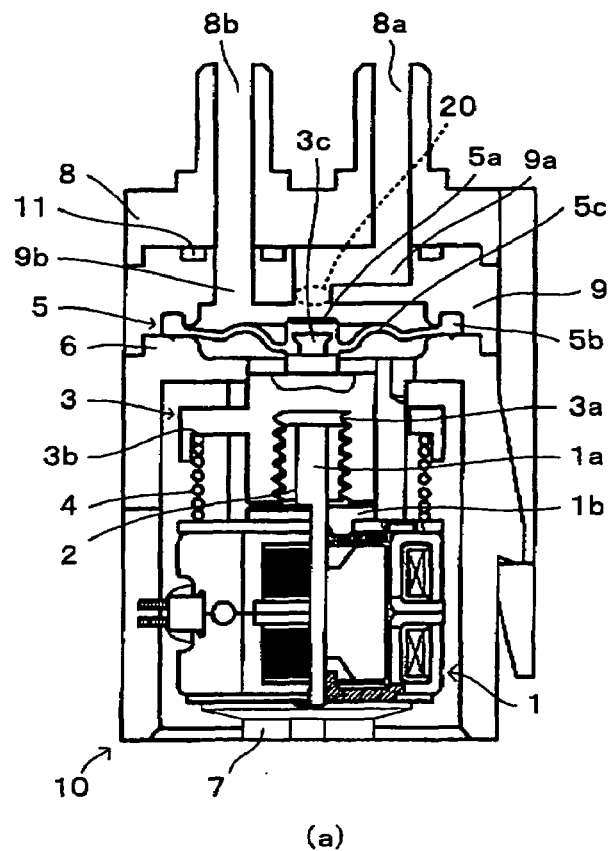
FIGS. 4(a) and 4(b) are sectional views showing opened and closed states in which an opening part of the valve drive device shown in FIG. 1 is opened and closed.

A valve drive device in accordance with an embodiment of the present invention will be described below with reference to the accompanying drawings. The valve drive device described below can be mounted on a pump having an inflow path, a plurality of outflow paths, a pump chamber and a pump mechanism.

FIG. 1 is a longitudinal sectional view showing a valve drive device 10 in accordance with an embodiment of the present invention. FIG. 2 is an exploded view showing the valve drive device 10 in accordance with the embodiment. The left half side in FIG. 2 shows longitudinal sectional views of respective parts and the right half side in FIG. 2 shows plan views of the respective parts.

In FIGS. 1 and 2, the valve drive device 10 is mainly structured of a stepping motor 1 (hereinafter, simply referred to as a motor) as a drive source, a case 6 within which the motor 1 is provided, and a case 8 in which an inflow port 8a (inflow opening) for fluid and an outflow port 8b (outflow opening) for fluid are formed and which engages with the case 6.

A lead screw 2 comprising of, for example, a right-hand screw is press-fitted and fixed to a rotor shaft 1a of the motor 1. The lead screw 2 rotates in the same rotating direction as the motor 1. A female screw 3a of a valve holding member 3 is threadedly engaged with the lead screw 2. In other words, a valve holding member 3 corresponding to an example of a linearly moving member is concentrically formed with the lead screw 2 corresponding to an example of a rotational member and is engaged with the lead screw 2 through a female screw 3a which is formed inside of the valve holding member 3. Therefore, when the motor 1 is rotated in a CCW direction (counterclockwise direction) viewed from the lead screw 2 side, the valve holding member 3 is moved near to the motor 1. On the other hand, when the motor 1 is rotated in a CW direction (clockwise direction) viewed from the lead screw 2 side, the valve holding member 3 is moved away from the motor 1. In this manner, the lead screw 2 and the valve holding member 3 are engaged with each other by screw engagement and the valve holding member 3 is prevented from rotating and thus the rotation of the lead screw 2 is converted into a linear movement.

A spring receiving part 3b is formed on an outer peripheral side of the valve holding member 3 in a concentric manner. A spring 4 is held by the spring receiving part 3b and the motor 1. The spring 4 is comprised of a compression coiled spring to urge the valve holding member 3 in a direction such that the valve holding member 3 is moved away from the motor 1. In accordance with this embodiment, a compression coiled spring is used but, for example, a pulling coiled spring may be used. In this case, the pulling coiled spring may be disposed on an opposite face of the spring receiving part 3b of the valve holding member 3.

As shown in FIG. 2, a protruded diaphragm holding part 3c is formed at a center portion of the valve holding member 3. The diaphragm holding part 3c is fitted with an undercut part 5a of the diaphragm valve 5. A flange portion between the spring receiving part 3b and the diaphragm holding part 3c in the valve holding member 3 is formed with three circular arc-shaped rotation preventing hole parts 3d (see FIG. 2).

A projecting part 6a is formed in the case 6 into which the motor 1 is accommodated and the projecting part 6a is divided into three portions so as to engage with the above-mentioned rotation preventing hole parts 3d (see FIG. 2). Further, as shown in FIG. 2, the case 6 is provided with a back pressure relief hole 6b for releasing a back pressure by the diaphragm valve 5 which is a valve to the motor 1 side, a heat relief hole 6c for releasing heat at the time of operation of the motor 1, a groove 6d into which a flat spring 7 for mounting and positioning the motor 1 is fitted, and a groove 6e through which a wire for power feeding for the motor 1 is passed. In this embodiment, the projecting part 6a and the rotation preventing hole parts 3d engaging with the projecting part 6a correspond to a "converting mechanism" which converts rotation of the lead screw 2 into a linear movement to move the valve hold member 3 linearly. Further, the flat spring 7 is provided with a coming-out prevention part 7a, a spring part 7b and a spring part 7c which are fitted on both sides of the motor 1. The motor 1 is attached to the case 6 by these parts of the flat spring 7.

The diaphragm valve 5 which is formed of an elastic body having rubber elasticity is disposed between the case 6 and the case 9. More specifically, an outer peripheral portion 5b of the diaphragm valve 5 is sandwiched between and fixed by the case 6 and the case 9 (see FIG. 1) and, at the same time, a bead 5e is also sandwiched and fixed by them. The bead 5e prevents fluid from leaking from a gap between the case 6 and the case 9 to enhance sealing property. Further, since a film part 5c of the diaphragm valve 5 is required to be easily deformed, the film part 5c is formed in a circular arc shape such that a stress is not concentrated.

A case 8 is engaged with the case 6 through the diaphragm valve 5, the case 9 and a seal ring 1. The case 9 is formed with a flow path 9a for flowing fluid from an inflow port 8a and a flow path 9b for flowing the fluid to an outflow port 8b. In this embodiment, a part of the flow path is formed by utilizing the diaphragm valve 5 and the case 9. Accordingly, fluid, which flows in from the inflow port 8a and passes through the flow path 9a, passes through the opening part 20 and then reaches to the flow path 9b through a flow path structured with the diaphragm valve 5 and the case 9. The seal ring 11 is disposed so as to be sandwiched between the case 8 and the case 9 for preventing the fluid from leaking from a gap between the case 8 and the case 9 to enhance sealing property.

Next, a center portion of the valve drive device 10 (near portion of the diaphragm valve 5) will be described below with reference to FIG. 3.

FIG. 3 is an enlarged view showing the center portion of the valve drive device 10 shown in FIG. 1.

As shown in FIG. 3, the bead 5d formed in a fine-pointed concentric shape is formed on a face on an opposite side to the motor 1 of the undercut part 5a of the diaphragm valve 5. A face of the case 9 with which the bead 5d is abutted becomes a sealing surface when the opening part 20 is closed. Further, a diameter of the diaphragm holding part 3c is set to be smaller than that of the fine-pointed bead 5d. Therefore, an enough pressure is applied to the bead 5d through the diaphragm holding part 3c and thus a stable sealing property with a high degree of reliability can be obtained even with small force.

In FIG. 3, the valve is in an opened state, and a screw pitch and an angle of a thread ridge in the lead screw 2 are the same as those of the female screw 3a of the diaphragm holding part 3c. In accordance with an embodiment of the present invention, a play "Z" (gap space) is formed in an axial direction of the rotor shaft 1a.

As described above, in the valve drive device 10 in accordance with an embodiment, the valve holding member 3 is urged in a direction separated from the motor 1 by a spring 4. Therefore, when the valve holding member 3 is linearly moved, a slant face on the motor 1 side of a screw part of the lead screw 2 is abutted with a slant face on an opposite side to the motor 1 of the female screw 3a of the valve holding member 3. In other words, the lead screw 2 and the valve holding member 3 are maintained to be engaged with each other.

On the other hand, when the opening part 20 is closed with the bead 5d of the diaphragm valve 5, the slant face on the opposite side to the motor 1 of the screw part of the lead screw 2 is not abutted with the slant face on the motor 1 side of the female screw 3a of the valve holding member 3. In other words, in this case, the lead screw 2 and the valve holding member 3 are maintained in a non-abutted state through the play "Z" between the screw part of the lead screw 2 and the female screw 3a of the valve holding member 3.

Figure 4B:
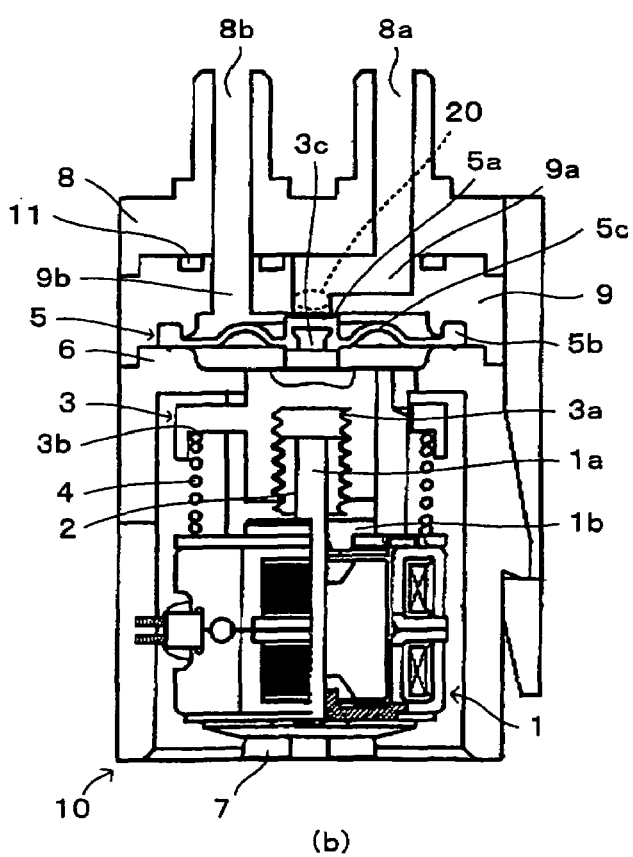
Figure 5A:
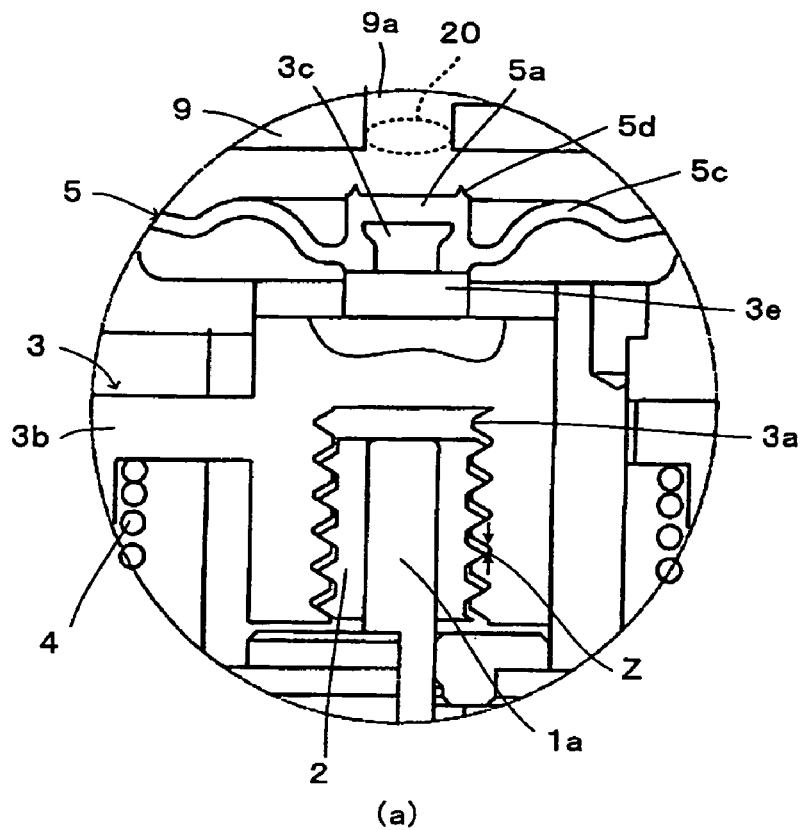
FIGS. 5(a) and 5(b) are enlarged views showing center portions of the valve drive devices shown in FIGS. 4(a) and 4(b).
Figure 5B:
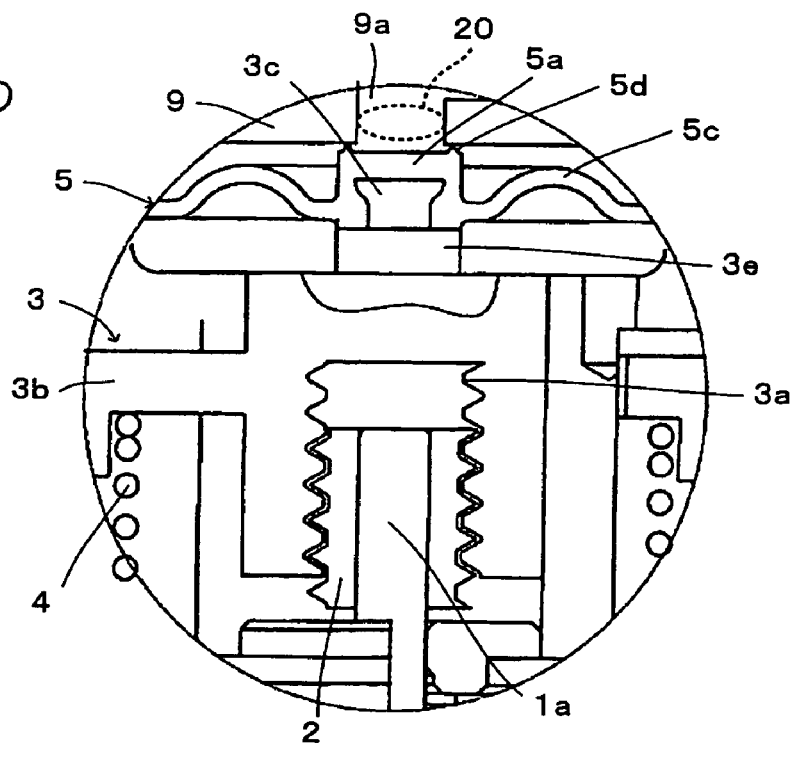

How the opening part 20 is closed will be described in detail with reference to FIGS. 4(*a*), 4(*b*) and 5(*a*), 5(*b*). FIGS. 4(*a*) and 4(*b*) are sectional views showing opened and closed states in which the opening part 20 of the valve drive device 10 shown in FIG. 1 is opened and closed. FIGS. 5(*a*) and 5(*b*) are enlarged views showing center portions of the valve drive devices 10 shown in FIGS. 4(*a*) and 4(*b*). The state shown in FIG. 4(*a*) and FIG. 5(*a*) is the same as that in FIGS. 1 and 3.

As shown in FIGS. 4(*a*) and 5(*a*), when the valve holding member 3 is linearly moved, the lead screw 2 and the valve holding member 3 are engaged with each other by an urging force of the spring 4.

On the other hand, as shown in FIGS. 4(*b*) and 5(*b*), when the opening part 20 is closed with the diaphragm valve 5, i.e., with the bead 5d, the urging force of the spring 4 is balanced with a force of counteraction to the diaphragm valve 5 from the case 9 and the lead screw 2 is not engaged with the valve holding member 3 via the play "Z". In other words, the bead 5d of the diaphragm valve 5 is abutted with a periphery of the opening part 20 in an urging state by the spring 4 and, as a result, the opening part 20 is closed.

According to the valve drive device 10 in accordance with this embodiment, a closing force for closing the opening part 20 is stably obtained by the spring 4. Therefore, the sealing property in the closing state of the diaphragm valve 5 is stabilized and thus reliability regarding closing performance of the diaphragm valve 5 can be improved.

Further, in the closing state of the diaphragm valve 5, the lead screw 2 and the valve holding member 3 are in a non-engaging state with each other through the play "Z" between the lead screw 2 and the valve holding member 3. Therefore, an excessive force is not applied to the diaphragm valve 5 and the closing performance can be prevented from varying due to hysteresis and abrasion of the diaphragm valve 5. Further, the closing force in the closing state of the diaphragm valve 5 can be accurately set by measuring an urging force of the spring 4 in advance.

According to the valve drive device 10 in accordance with an embodiment, the spring 4 is disposed on an outer side and the lead screw 2 is disposed on an inner side. Therefore, the lead screw 2 serves as a part of an axial center for the spring 4 and thus deflection of the spring 4 can be prevented and a stable closing force can be obtained. Further, since the diaphragm holding part 3c of the valve holding member 3 is formed in a smaller diameter than that of the opening part 20, the diaphragm valve 5 is uniformly deformed when the undercut part 5a closes the opening part 20, and thus a stable sealing property with a high degree of reliability can be obtained.

In addition, the motor 1 is positioned and fixed with the flat spring 7 from one direction and thus the motor 1 can be easily installed and increase of manufacturing cost can be prevented.

In the above-mentioned embodiment, the lead screw 2 and the valve holding member 3 are engaged with each other through a male screw and the female screw 3a. However, the lead screw 2 and the valve holding member 3 may be engaged with each other through, for example, a rack-and-pinion gear. Further, in the above-mentioned embodiment, the female screw 3a of the valve holding member 3 is used as an example of a pressed part which is engaged with and pressed by the lead screw 2. However, the present invention is not limited to this embodiment For example, when a cam is substituted for the lead screw 2, a portion (member) abutting with the cam corresponds to the pressed part.

Different from the valve drive device 1 shown in FIGS. 1 through 4, the valve drive device 10 in accordance with an embodiment may be structured such that the positions of the inflow port 8a and the outflow port 8b may be reversed and they may be formed in a rectangular hole rather than a circular hole. Further, the lead screw 2 may be integrally formed with the rotor shaft 1a, and the coupling state of the protruded portion to the recessed portion between the valve holding member 3 and the diaphragm valve 5 may be reversed. Further, the tip end of the bead 5d of the diaphragm valve 5 may be formed in a round shape and the bead may be formed on the case 9 side rather than the diaphragm valve 5 side, and various modifications may be adopted.

FIGS. 6(a), 6(b), 6(c) and 6(d) are explanatory views for describing a control method for the valve drive device 10 in accordance with an embodiment of the present invention.

As described with reference to FIGS. 4(a) and 5(a), when the valve holding member 3 is linearly moved in a direction separated from the motor 1, the slant face on the motor 1 side of the screw part of the lead screw 2 is abutted with the slant face on the opposite side to the motor 1 of the female screw 3a of the valve holding member 3 by the urging force of the spring 4 (see FIG. 6(a)). More specifically, when pulse voltages are applied to the motor 1 to rotate the lead screw 2 in a CCW direction, the valve holding member 3 is moved in a direction separated from the motor 1. At this time, the lead screw 2 and the valve holding member 3 are engaged with each other.

When the bead 5d of the valve holding member 3 abuts with the case 9, the diaphragm valve 5 is subjected to a force of counteraction from the case 9. When the urging force of the spring 4 balances with the force of counteraction from the case 9 and then the lead screw 2 is further moved to a state that the slant face on the motor 1 side of the screw part of the lead screw 2 is separated from the slant face on the opposite side to the motor 1 of the female screw 3a of the valve holding member 3 and then the motor 1 is stopped. In this state, the slant face on the opposite side to the motor 1 of the screw part of the lead screw 2 is not abutted with the slant face on the motor 1 side of the female screw 3a of the valve holding member 3 (see FIG. 6(b)).

As described above, the control method in accordance with this embodiment, the motor 1 is driven such that the bead 5d of the diaphragm valve 5 abuts with the opening part 20 to close it and further the motor 1 is driven to a position where the bead 5d is sufficiently pressed. However, the motor 1 is stopped just before the lead screw 2 presses the diaphragm valve 5 through the valve holding member 3. In other words, the lead screw 2 is advanced a little from the position where the bead 5d is pressed and deformed in a specified quantity to close the opening part 20 with the diaphragm valve 5 by the spring 4 and then the lead screw 2 is stopped (see FIG. 6(a)→FIG. 6(b)). In this manner, the lead screw 2 and the valve holding member 3 are in a non-engagement state and thus the closing force for closing the opening part 20 can be stably obtained. Further, in order to stop the linear movement of the valve holding member 3 at a desired position, the number of pulses of the pulse voltage which is applied to the motor 1 may be appropriately adjusted and it is not required to change rotating direction of the motor 1. Therefore, a closing force for closing the opening part 20 can be stably obtained while a control program for controlling the motor 1 is simplified.

Next, another control method for the valve drive device 10 will be described below with reference to FIGS. 6(c) and 6(d).

First, similarly to the above-mentioned embodiment, the lead screw 2 and the valve holding member 3 are moved to the non-engagement state positioned in the play "Z" from the engaging state (see FIG. 6(a)→FIG. 6(b)). After that, pulse voltages for moving the motor 1 more than a prescribed stroke operation are applied to the motor 1 and, as a result, the slant face on the opposite side to the motor 1 of the screw part of the lead screw 2 is brought into an abutted state with the slant face on the motor 1 side of the female screw 3a of the valve holding member 3 (FIG. 6(b)→FIG. 6(c)). In other words, the lead screw 2 and the valve holding member 3 are engaged with each other again. In this state, the tip end of the bead 5d of the diaphragm valve 5 is further abutted with the periphery of the opening part 20 to be fully deformed (see FIG. 6(c)).

After that, at a prescribed timing, the rotation of the motor 1 is reversed in the CW direction such that the screw part of the lead screw 2 is brought into a position within the region of the play "Z". More specifically, for example, after a specified number of pulse voltages for rotating the motor 1 in the CCW direction has been applied to the motor 1, four or five steps of pulse voltages for rotating in the CW direction are applied to the motor 1. In this manner, the motor 1 can be reversed a little in the range of the play "Z", for example, the rotor shaft 1a is reversed by about 90 degrees. In accordance with this embodiment, an encoder is not necessary and thus reduction of manufacturing cost and downsizing of the motor 1 can be obtained. Alternatively, it may be structured that an encoder is provided in the motor 1 and above-mentioned four or five steps of pulse voltages for rotating the motor 1 in the CW direction are applied to the motor 1 on the basis of detecting the step-out of the motor 1 with the encoder.

When the motor 1 is slightly reversed in the range of the play "Z", the valve becomes to a closing state in which the valve holding member 3 is pressed against the case 9 only by the urging force of the spring 4. In other words, the slant face on the opposite side to the motor 1 of the screw part of the lead screw 2 is brought into a non-abutted state with the slant face on the motor 1 side of the female screw 3a of the valve holding member 3 (see FIG. 6(d)). At this time, the bead 5d is restored by its elastic force (resilient force) to a position where a force of counteraction that the diaphragm valve 5 receives from the case 9 is balanced with the urging force of the spring 4 and the tip end of the bead 5d becomes in a predetermined deformed state.

As described above, according to the control method in accordance with this embodiment, the bead 5d of the diaphragm valve 5 is abutted with the periphery of the opening part 20 by the spring 4 and the motor 1 is driven to a position further than the predetermined position of the bead 5d being deformed. After the diaphragm valve 5 has been pressed against the case 9 by the valve holding member 3, the lead screw 2 is retreated a little to a position where the lead screw 2 is not engaged with the valve holding member 3 and the valve holding member 3 is stopped (FIG. 6(c)→FIG. 6(d)). In this manner, the closing force for closing the opening part 20 can be obtained stably. Further, according to this control method, only with controlling the rotating direction of the motor 1, the non-engaging state between the lead screw 2 and the valve holding member 3 can be simply obtained. As a result, the force for closing the opening part 20 can be simply and stably obtained.

As described above, according to the control methods for the valve drive device 10, a stable sealing property can be secured by the urging force of the spring 4 instead of securing the sealing property by a motor torque. Further, a valve with a high degree of durability can be provided without providing a large stress in the diaphragm valve 5 and the lead screw 2. In addition, since the closing force for closing the opening part 20 is obtained stably by the urging force of the spring 4, reliability regarding closing performance of the diaphragm valve 5 can be improved.

In accordance with an embodiment, when the motor 1 is rotated in the CW direction in the state shown in FIG. 6(*d*), the valve holding member 3 is pulled to the motor 1 side under the state as shown in FIG. 6(*a*) and the valve is opened. In this manner, an opening degree of the valve may be controlled on the basis of a pulse number applied to the motor 1.

The valve drive device, the control method for the valve drive device and the pump in accordance with the embodiments of the present invention are effective to improve reliability regarding closing performance of a valve element.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A valve drive device comprising:
    a motor;
    a rotational member which is rotated by the motor;
    a linearly moving member which is engaged with the rotational member;
    a converting mechanism structured to convert rotation of the rotational member into linear movement to linearly move the linearly moving member;
    a diaphragm valve which is formed of an elastic body for opening or closing an opening part based on the linear movement of the linearly moving member; and
    an urging member structured to close the opening part through the diaphragm valve which is abutting with the opening part in an urging state;
    wherein the converting mechanism is structured to convert rotation of the rotational member into linear movement of the linearly moving member by engaging the rotational member and the linearly moving member with each other; and
    the urging member is structured to close the opening part with the diaphragm valve in a state that the rotational member and the linearly moving member are in a non-engagement state.

2. The valve drive device according to claim 1, wherein the linearly moving member includes a pressed part which is engaged with and is pressed by the rotational member and the linearly moving member is linearly moved with the pressed part being pressed by the rotational member.

3. The valve drive device according to claim 2, wherein the rotational member and the pressed part of the linearly moving member are engaged with each other through screw engagement or cam engagement.

4. The valve drive device according to claim 2, further comprising a gap space which is formed between the rotational member and the pressed part of the linearly moving member with which the rotational member and the linearly moving member are in the non-engagement state when the opening part is closed by the diaphragm valve.

5. The valve drive device according to claim 1, wherein the motor is a stepping motor, the rotational member is a lead screw which is fixed to a rotor shaft of the motor, and the linearly moving member is engaged with the lead screw through screw engagement having a play in an axial direction and is prevented from rotating through the converting mechanism.

6. The valve drive device according to claim 5, wherein the linearly moving member is a valve holding member which is provided with the diaphragm valve, and the valve holding member is formed so as to be concentric with the lead screw and is provided with a screw part which is formed in an inside of the valve holding member so as to be engaged with the lead screw and is provided with a spring receiving part which is formed in an outer peripheral portion of the valve holding member so as to receive the urging member.

7. The valve drive device according to claim 6, wherein when the opening part is closed by the diaphragm valve, a screw of the screw part of the valve holding member is set to be an intermediate position where its screw is not engaged with a screw of the lead screw through the play in the axial direction, and the opening part is closed with the diaphragm valve only by the urging force of the urging member.

8. A control method for a valve drive device comprising:
    providing the valve drive device, wherein the valve drive device comprises:
        a motor;
        a rotational member which is rotated by the motor;
        a linearly moving member which is engaged with the rotational member;
        a converting mechanism structured to convert rotation of the rotational member into linear movement to linearly move the linearly moving member;
        a diaphragm valve which is formed of an elastic body for opening or closing an opening part based on the linear movement of the linearly moving member; and
        an urging member structured to close the opening part through the diaphragm valve which is abutting with the opening part in an urging state;
        wherein the converting mechanism is structured to convert rotation of the rotational member into linear movement of the linearly moving member by engaging the rotational member and the linearly moving member with each other; and
        the urging member is structured to close the opening part with the diaphragm valve in a state that the rotational member and the linearly moving member are in a non-engagement state;
    driving the motor to move the linearly moving member to a position where the diaphragm valve is abutted with and closes the opening part by the urging member; and
    stopping the motor at a position where the rotational member and the linearly moving member are in a non-engagement state.

9. The control method for a valve drive device according to claim 8, wherein after driving the motor to move the linearly moving member to the position where the diaphragm valve is abutted with and closes the opening part by the urging member, rotation of the rotational member is reversed and then the motor is stopped at a position where the rotational member and the linearly moving member are in a non-engagement state.

10. The control method for a valve drive device according to claim 9, wherein the motor is a stepping motor, the rotational member is a lead screw which is fixed to a rotor shaft of the motor, and the linearly moving member is a valve holding member which is engaged with the lead screw through screw engagement having a play in an axial direction and is prevented from rotating and is provided with the diaphragm valve, and the control method further comprising:

rotating the lead screw by rotating the motor;

linearly moving the valve holding member which is engaged with the lead screw to cause the diaphragm valve to abut with the opening part;

after that, reversing the motor to stop at a position where the lead screw is not engaged with the valve holding member through the play in the axial direction and, as a result, the opening part is closed with the diaphragm valve only by the urging force of the urging member.

11. The control method for a valve drive device according to claim 8, wherein after driving the motor to move the linearly moving member to the position where the diaphragm valve is abutted with and closes the opening part by the urging member, rotation of the rotational member is stopped at a position where the rotational member and the linearly moving member are in a non-engagement state before the rotational member presses the linearly moving member.

12. The control method for a valve drive device according to claim 11, wherein the motor is a stepping motor, the rotational member is a lead screw which is fixed to a rotor shaft of the motor, and the linearly moving member is a valve holding member which is engaged with the lead screw through screw engagement having a play in an axial direction and is prevented from rotating and is provided with the diaphragm valve, and the control method further comprising:

rotating the lead screw by rotating the motor;

linearly moving the valve holding member which is engaged with the lead screw to cause the diaphragm valve to abut with the opening part;

after that, stopping rotation of the lead screw at a position where the lead screw and the valve holding member are in a non-engagement state through the play in the axial direction before the lead screw presses the valve holding member and, as a result, the opening part is closed with the diaphragm valve only by the urging force of the urging member.

13. The valve drive device according to claim 1, wherein the converting mechanism comprises a female screw that is formed inside of the linearly moving member.

* * * * *